US008732374B2

(12) United States Patent
Hartwich et al.

(10) Patent No.: US 8,732,374 B2
(45) Date of Patent: May 20, 2014

(54) SUBSCRIBER NODE OF A COMMUNICATION SYSTEM HAVING A FUNCTIONALLY SEPARATE TRANSMISSION EVENT MEMORY

(75) Inventors: Florian Hartwich, Reutlingen (DE); Marc Schreier, Ditzingen (DE); Franz Bailer, Moessingen (DE); Markus Ihle, Jettenburg (DE); Tobias Lorenz, Schwieberdingen (DE); Christian Horst, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 556 days.

(21) Appl. No.: 12/736,758

(22) PCT Filed: Mar. 5, 2009

(86) PCT No.: PCT/EP2009/052578
§ 371 (c)(1),
(2), (4) Date: Mar. 24, 2011

(87) PCT Pub. No.: WO2009/135707
PCT Pub. Date: Nov. 12, 2009

(65) Prior Publication Data
US 2011/0167188 A1 Jul. 7, 2011

(30) Foreign Application Priority Data

May 5, 2008 (DE) .......................... 10 2008 001 548

(51) Int. Cl.
*G06F 13/14* (2006.01)
*G06F 3/00* (2006.01)
*G06F 5/00* (2006.01)
*G06F 13/36* (2006.01)

(52) U.S. Cl.
USPC .............................. 710/305; 710/52; 710/310

(58) Field of Classification Search
CPC . H04L 49/90; H04L 49/901; H04L 12/40032; H04L 12/40065; H04L 45/40143; H04L 2012/40215; G06G 13/385; G06G 5/10; G06G 5/06; G06G 13/4022; G06G 13/4027; G06G 13/4072; G06G 13/387; G06G 13/4059; G06G 13/4036
USPC ............................................. 710/52, 305, 310
See application file for complete search history.

(56) References Cited

U.S. PATENT DOCUMENTS 4,827,409 A * 5/1989 Dickson ........................ 710/52

(Continued)

FOREIGN PATENT DOCUMENTS

CA 2207791 C * 2/2000

(Continued)

OTHER PUBLICATIONS

Mubeen, S.; Mam-Turja, J.; Sjodin, M., "Extending response-time analysis of Controller Area Network (CAN) with FIFO queues for mixed messages," Emerging Technologies & Factory Automation (ETFA), 2011 IEEE 16th Conference on , pp. 1,4, Sep. 5-9, 2011.*

(Continued)

*Primary Examiner* — Faisal M Zaman
(74) *Attorney, Agent, or Firm* — Kenyon & Kenyon LLP

(57) ABSTRACT

A subscriber node of a communication system, a communication system and a method for transmitting a message in the communication system. The message is transmitted from a first subscriber node of the communication system via a data bus of the communication system to a second subscriber node of the communication system. An application program of the first subscriber node files the message, that is to be sent, in a message memory, from where it is retrieved by a communication controller, upon a sending command of the application program, and is transmitted via the data bus. In particular in the case of a cancellation of the transmission job, in order to be able to improve the capacity utilization and the efficiency of a host CPU, it is provided that a transmission event for the message, that is to be sent or that has been sent, is stored in at least one transmission event memory, that is functionally separate from the message memory, and that the application program is able to access the data stored in the event memory at any time.

10 Claims, 3 Drawing Sheets

(56) References Cited

U.S. PATENT DOCUMENTS

| | | | | |
|---|---|---|---|---|
| 4,989,135 | A * | 1/1991 | Miki | 710/22 |
| 5,548,796 | A * | 8/1996 | Ketchum | 710/52 |
| 5,768,625 | A | 6/1998 | Muramatsu et al. | |
| 6,112,268 | A * | 8/2000 | Ohashi et al. | 710/52 |
| 6,757,776 | B1 * | 6/2004 | Pew | 710/310 |
| 6,925,507 | B1 * | 8/2005 | Hersent | 710/52 |
| 6,976,072 | B2 * | 12/2005 | Mathieson | 709/224 |
| 7,454,544 | B2 * | 11/2008 | Bond et al. | 710/64 |
| 8,195,960 | B2 * | 6/2012 | Hirai | 713/193 |
| 2003/0058883 | A1 * | 3/2003 | Larson et al. | 370/463 |
| 2003/0187852 | A1 | 10/2003 | Abe et al. | |
| 2005/0024664 | A1 * | 2/2005 | Schmidt | 358/1.13 |
| 2005/0080953 | A1 * | 4/2005 | Oner et al. | 710/52 |
| 2007/0162658 | A1 * | 7/2007 | Furukawa et al. | 710/52 |
| 2009/0132735 | A1 * | 5/2009 | Gelberg et al. | 710/52 |
| 2009/0244621 | A1 * | 10/2009 | Young et al. | 358/1.16 |
| 2013/0067143 | A1 * | 3/2013 | Hasegawa et al. | 711/103 |

FOREIGN PATENT DOCUMENTS

| | | | |
|---|---|---|---|
| CN | 1381982 | | 11/2002 |
| CN | 1705295 | | 12/2005 |
| CN | 102347778 | A * | 2/2012 |
| EP | 1 085 722 | | 3/2001 |
| JP | 4-313936 | | 11/1992 |
| JP | 5-236056 | | 9/1993 |
| JP | 2000-134238 | | 5/2000 |
| JP | 5136610 | B2 * | 2/2013 |

OTHER PUBLICATIONS

Murtaza, A.F.; Khan, Z.A., "Starvation free controller area network using master node," Electrical Engineering, 2008. ICEE 2008. Second International Conference on , pp. 1,6, Mar. 25-26, 2008.*

Shokry, H.; Shedeed, M.; Hammad, S.; Shalan, M.; Wandan, A., "Hardware EDF scheduler implementation on controller area network controller," Design and Test Workshop (IDT), 2009 4th International , pp. 1,6, Nov. 15-17, 2009.*

Vyas, P.; Hangal, S.A.; Vachhani, L., "Methods for equitable distribution of bus access among nodes of Controller Area Network," Industrial and Information Systems (ICIIS), 2012 7th IEEE International Conference on , pp. 1,6, Aug. 6-9, 2012.*

Cf. SAE Paper 860391, International Congress and Exposition, Detroit, Michigan, Feb. 24-28, 1986.

* cited by examiner

SUBSCRIBER NODE OF A COMMUNICATION SYSTEM HAVING A FUNCTIONALLY SEPARATE TRANSMISSION EVENT MEMORY

FIELD OF THE INVENTION

The present invention relates to a subscriber node of a communication system. The present invention also relates to a communication system including a data bus and a plurality of subscriber nodes connected to it for the purpose of data transmission. Finally, the present invention also relates to a method for transmitting a message from a first subscriber node of a communication system via a data bus of the communication system to a second subscriber node of the communication system.

BACKGROUND OF THE INVENTION

One example of a known communication system of the type stated above is a CAN (controller area network) communication system. What is involved here is an asynchronous, serial bus system, developed in 1983 by Bosch, for the networking of control units in automobiles, and introduced in 1986 (cf. SAE Paper 860391, International Congress and Exposition, Detroit, Mich., Feb. 24-28, 1986) together with Intel, in order to reduce the length of wiring harnesses in motor vehicles, and thereby to save space and weight. The use of the CAN bus is not limited to the automotive field, however. The CAN bus has meanwhile found its way into building management systems and into machine tools. In a CAN bus, data transmission takes place in so-called data frames which, besides the user data that are to be transmitted (the actual messages) also have configurational data at the beginning (the header part) and test data at the end (the CRC part) of the frame. Other examples of a known communication system of the above-mentioned type are a FlexRay bus, a MOST (media oriented systems transport) bus or any field bus, such as a LIN (local interconnect network) bus.

In CAN and other protocols, messages are transmitted between a first and a second subscriber node by an application program of the first subscriber node copying the message to be sent into a message memory, from where, upon a send command of the application program, it is retrieved by a communication controller and transmitted via the data bus. It is frequently necessary, in this context, to inform the application program on the result of transmission jobs and the possible cancellation of transmission jobs. This is the case, for example, if, during the processing of a transmission job, an additional, more urgent transmission job comes in. In such a case, the pending transmission job is canceled, but a sending process that has already been started (start of frame (SOF) bit already sent) is not broken off, but is continued until either the arbitration is lost, an error occurs or the message has been successfully sent. In the case of CAN and other protocols, data are transmitted serially, and under certain circumstances it can take a long time until the end of the data frame is reached. During this time, the computing unit (CPU; central processing unit) of the subscriber node is practically blocked, since it has to await the end of the data frame. This may additionally lead to an unacceptable delay in the processing of the further, more urgent transmission job.

Only after the end of the data frame of the first transmission job has been reached, is the CPU able to attend to the urgent transmission job. For this, the application program of the subscriber node copies the message to be sent of the urgent transmission job in a message memory, from where it is retrieved by a communication controller upon a sending command of the application program, and is transmitted via the data bus. After taking care of the urgent transmission job, the application program continues again with the interrupted transmission. For this purpose, it is required that information on the status of the transmission job processed before the urgent request be available to the application program. The application program should have the possibility of informing itself on the result of transmission jobs and the possible cancellation of transmission jobs.

That is why, in the case of the known subscriber nodes, the message memories, whose content is to be sent, are connected using status bits. Frequently, only the success of a transmission job is able to be indicated in the status bits. Some results, especially in the case of a cancellation of a transmission job (Tx cancellation), are not able to be shown with the aid of the status bits.

SUMMARY OF THE INVENTION

The exemplary embodiments and/or exemplary methods of the present invention are based on the object of configuring and refining a subscriber node to the extent that information on transmission jobs is able to be managed and made accessible to the application program.

To attain this object, it is provided, starting from subscriber nodes of the type mentioned at the outset, that the subscriber node have at least one transmission event memory that is functionally separate from the message memories, in which a transmission event is stored for at least one message that is to be sent or has been sent.

The exemplary embodiments and/or exemplary methods of the present invention relate to a subscriber node of a communication system. The communication system includes a data bus, to which the subscriber node and at least one additional subscriber node are connected. The subscriber node has a communication controller for sending messages via the data bus and/or for receiving messages from the data bus and a message memory for temporary storage of messages to be sent or received.

The exemplary embodiments and/or exemplary methods of the present invention also relate to a communication system including a data bus and a plurality of subscriber nodes connected to it for the purpose of data transmission. The subscriber nodes each have a communication controller for sending messages via the data bus and/or for receiving messages from the data bus and a message memory for temporary storage of messages to be sent or received. Finally, the exemplary embodiments and/or exemplary methods of the present invention also relate to a method for transmitting a message from a first subscriber node of a communication system via a data bus of the communication system to a second subscriber node of the communication system. An application program of the first subscriber node files the message to be sent in a message memory, in this context, from where it is retrieved by a communication controller upon a sending command of the application program, and is transmitted via the data bus.

That is, according to the exemplary embodiments and/or exemplary methods of the present invention, the information on the transmission jobs is not filed in the message memories, whose contents are to be sent, but in a separate list, as component of a send event memory. This has the advantage that the application program does not have to collect together the information from various message memories, but that the information is able to be called up, at a fixed place, which may be sorted by time, and that, after the cancellation of a transmission job, the message memories are available again right away, and continue to be able to be used, without having to wait for the result of this cancellation. In particular, after the cancellation of a transmission job, a CPU of the subscriber node is able to turn right away to the processing of the next transmission job, and to file the message in the message memory, for example. After the cancellation, the CPU naturally is also available for any other activities. Using the exemplary embodiments and/or exemplary methods of the present invention, the processing of successive transmission jobs may be speeded up in the case of a cancellation of a transmission job, and the efficiency of the CPU is able to be improved. The exemplary embodiments and/or exemplary methods of the present invention also have the advantage that the status flags on the status of a transmission job are not coupled to the message memory.

According to one advantageous refinement of the present invention, it is provided that the transmission event include at least one of the following events:
message transmitted successfully,
message transmitted successfully, in spite of cancellation of a transmission job,
cancellation of the transmission job, transmission process not yet begun,
cancellation of the transmission job, transmission process ended after loss of the arbitration, and
cancellation of the transmission job, transmission process ended after an error.

Thus, because of the transmission events filed in the transmission event memory, the application program of the subscriber node is able to call up at any time the exact status or the end of a prior transmission job. Not only is information able to be called up as to whether the data transmission was successful, but also information telling under what circumstances the transmission was successful (without, or in spite of cancellation of the transmission job), and whether, or under what circumstances the transmission job was canceled (transmission process not yet begun (for instance, because the data bus was busy), transmission process ended after loss of the arbitration or transmission process ended after error). In the case of a continuation of data transmission whose transmission job was canceled, this additional information permits the application program to take suitable measures, for example, to make a new transmission job.

According to one specific embodiment of the present invention, it is provided that an identifier of the at least one message to be sent, or that has been sent, be stored in the transmission event memory. The identifier may permit a clear identification of the message or of the transmission job. Because of the identifier, filed in the transmission event memory, in addition to the transmission event for the at least one message to be sent, or that has been sent, a clear allocation of the transmission event to a certain message or a certain transmission job is possible even if a plurality of transmission events of various transmission jobs are stored in the event memory. Within the scope of the memory capacity, this makes possible reading out the transmission event for a certain message or for a certain transmission job at any time. The greater the capacity of the event memory, the more transmission events having associated data are able to be filed. Of course, beside the transmission event and the identifier, additional data may also be filed in the transmission event memory. Thus it is provided, for example, that one or more of the following data be stored in the transmission event memory:
a data length code of the at least one message that is to be sent or that has been sent,
a time mark that tells when the event occurred,
an address of the message memory for which the transmission job was present, and
a sequence counter that identifies data packages when larger data volumes are sent sequentially in a plurality of messages having the same identifier.

Because of the additional information, the handling of the stored transmission event by the application program is made easier. A time mark may be important for certain application programs. If the subscriber node has a plurality of message memories (so-called transmission buffers), then it may be ascertained, with the aid of the address of the message memory for which the transmission job was present, which transmission buffer is free for new transmission jobs. A sequence counter may be important during a software download, for example, if, for instance, at the end of the line or during a stop at work shop, subscriber nodes of the communication network, developed as control units, are programmed anew for the first time or having a new software version. In the process, the software is split up into a plurality of, for instance, 8-byte data packets which have the same identifier. The sequence counter states for which of the data packets a transmission event has been filed in the event memory and which of the data packets has been successfully transmitted.

The transmission event memory is advantageously organized as a FIFO (first in, first out) memory. The transmission event memory may have several memory elements, information on a message that is to be sent, or has been sent, being stored in each memory element. In practice, a capacity of the event memory of a few memory elements will be sufficient, as a rule. In case the transmission event memory threatens to overflow, because the application program has read out from it too few times, a warning signal may be emitted. If the memory actually overflows, an error signal may be emitted. Alternatively or in addition, it is conceivable that when the capacity of the transmission event memory is exceeded, the entries filed first are simply discarded. The transmission event memory advantageously includes a memory having random access (RAM; random access memory). Other types of implementation are also conceivable, such as flip-flops, these, however requiring a relatively large silicon surface, and consequently also giving rise to relatively high costs. One embodiment of the present invention is especially advantageous, in which the transmission event memory is developed as part of a message memory. In spite of the functional separation of the message memory and the transmission event memory, with respect to hardware, both may be developed in the same memory element, but in different memory regions. The size of the transmission event memory, particularly the number of memory elements of the event memory, may advantageously be freely configured by software, using configuration bits, for example. In this way, the size of the event memory may be simply adapted to the individual requirements, in a flexible manner.

As an additional attainment of the object of the exemplary embodiments and/or exemplary methods of the present invention, it is provided, starting from the communication system of the type mentioned at the outset, that at least one of the subscriber nodes have at least one transmission event memory that is functionally separated from the message memories, in which a transmission event is stored for at least one message that is to be sent or has been sent. According to advantageous further developments, the at least one subscriber node of the communication system according to the present invention may also have features of one or more of dependent Claims 2 through 8.

Finally, it is provided as a further attainment of the object of the exemplary embodiments and/or exemplary methods of the present invention, starting from the method for transmitting a message of the type named at the outset, that a transmission event for the message to be sent, or that has been sent, be stored in a transmission event memory that is functionally separated from the message memory, and that the application program is able to access the data stored in the event memory at any time.

Advantageous embodiments of the present invention will be explained in greater detail below, with reference to the figures.

DETAILED DESCRIPTION

Figure 1:
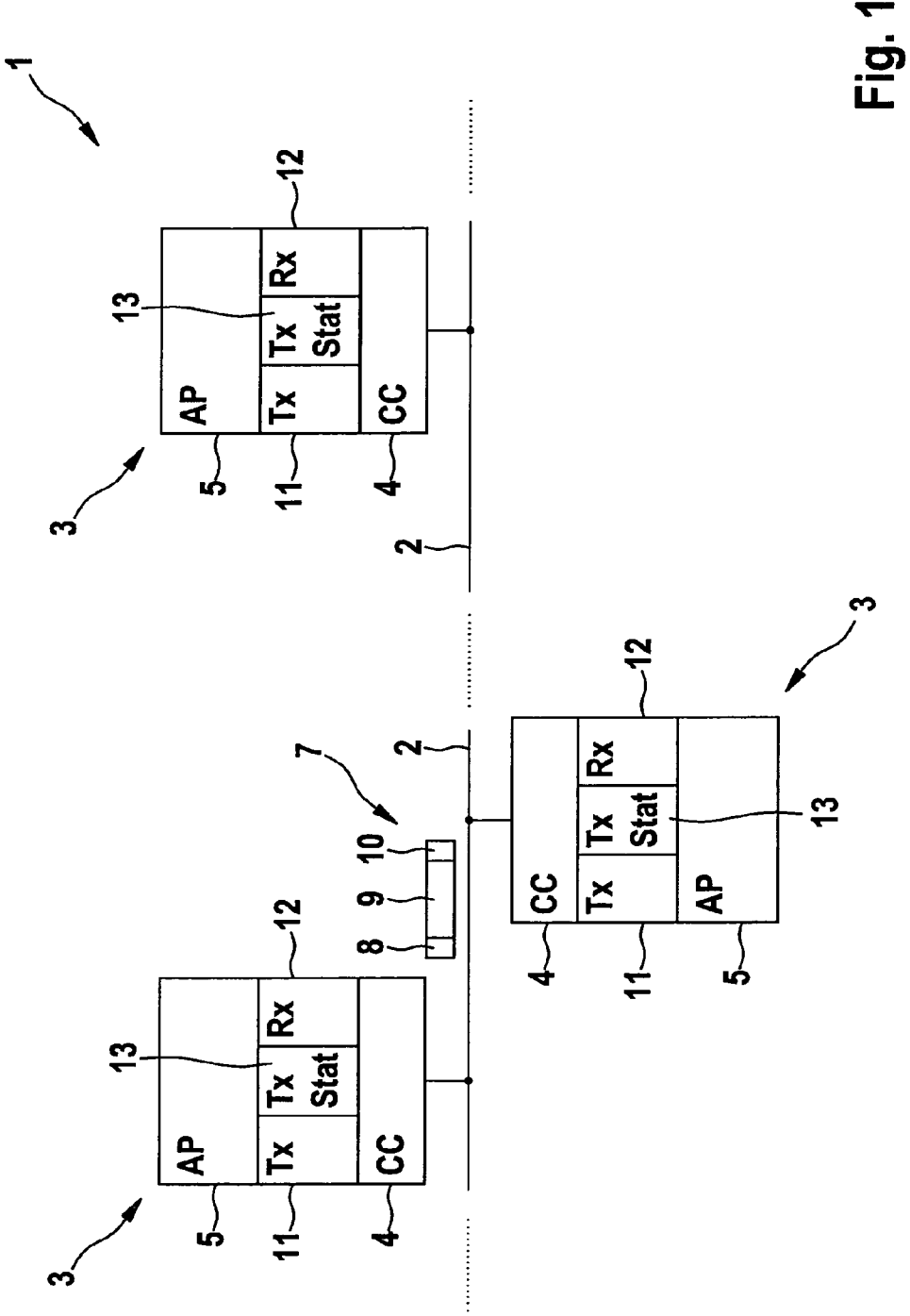
FIG. 1 shows an example of a communication network according to the present invention.

FIG. 1 shows a communication system according to the present invention, labeled as 1 in its entirety. Network 1 includes a data bus 2, which is shown symbolically by a single line. Data bus 2 may of course be developed as a one, two or multiple wire bus. The physical layer of data bus 2 may include one or more copper lines, one or more glass fiber lines or even optical (e.g. infrared) or radio connections. A plurality of subscriber nodes 3 is connected to data bus 2, of which only three are shown in FIG. 1 in exemplary fashion. Each node 3 is connected to data bus 2 via a communication module 4 (a so-called communication controller CC). Nodes 3 also have a host application 5 (a so-called application program AP).

Messages 7 may be transmitted via data bus 2 according to a serial communication protocol (e.g. CAN, FlexRay, LIN, MOST, among others). Communication module 4 is responsible for the reception and the transmission of messages 7 via data bus 2. Messages 7 each have a so-called header 8 having an identifier and additional configuration bits. Besides header 8, messages 7 also have a user data part 9 (so-called payload) and a so-called trailer 10. The identifier makes possible a clear-cut identification of messages 7. In CAN (controller area network), the identifier is a type of sender address, for instance, that permits ascertaining the origin of message 7 and characterizes content 9 of message 7.

Between application program 5 and communication controller 4, transmission buffer 11 (Tx) and reception buffer 12 (Rx) are logically situated as temporary memories for outgoing and incoming messages 7. Physically speaking, message memories 11, 12 may be developed as an integral component of communication controller 4, or separately from it. Message memories 11, 12 may be constructed as a type of FIFO (first in, first out). They are developed, for example, as memories having random access (so-called random access memory; RAM).

Figure 2:
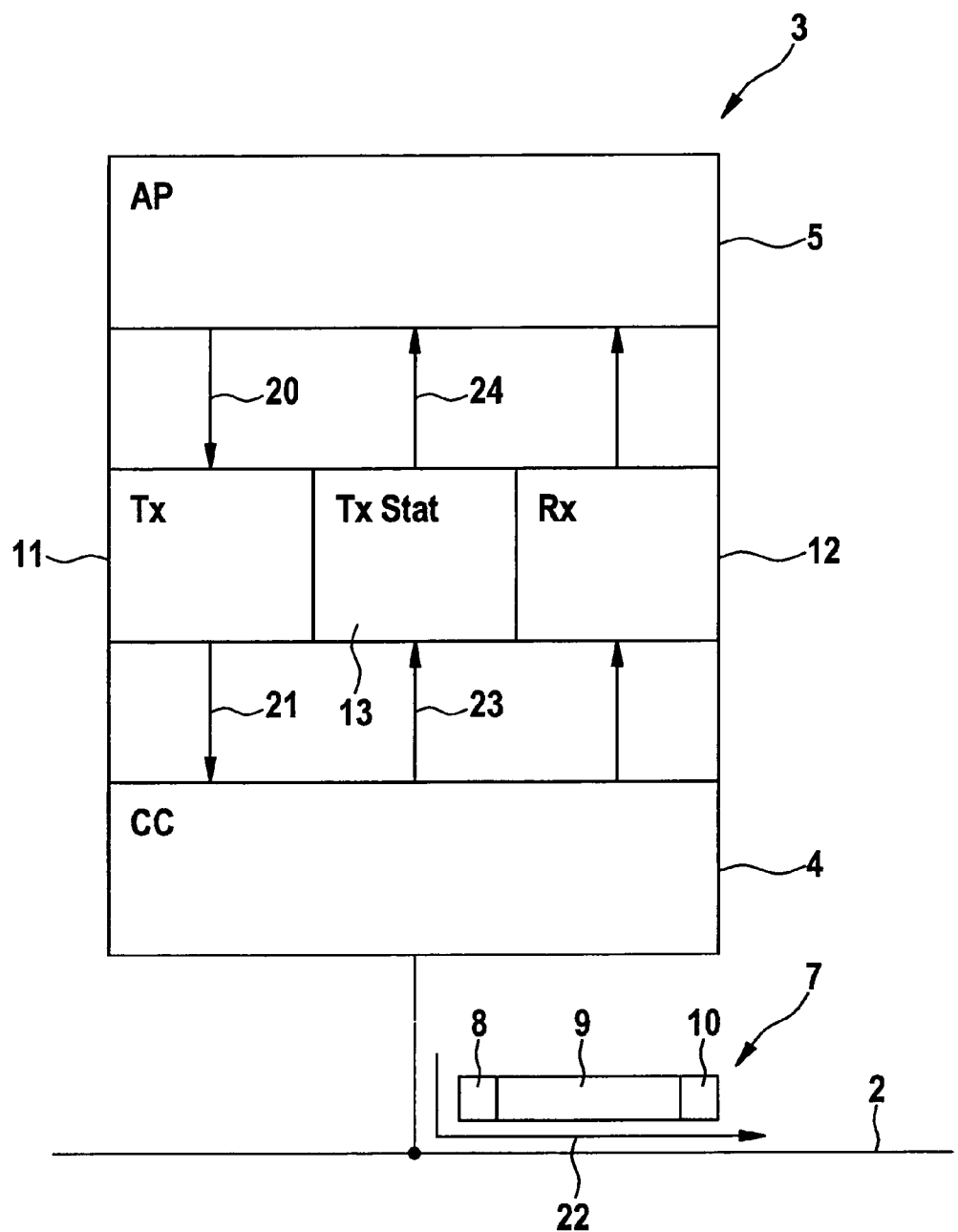
FIG. 2 shows an example of a subscriber node according to the present invention of a communication network as in FIG. 1.

When application program 5 of one of subscribers 3 wants to send a messages 7 via data bus 2 to another subscriber 3, it first files message 7 that is to be sent or its content 9 in transmission buffer 11 (arrow 20 in FIG. 2). Then, upon a sending command of application program 5, communication controller 4 retrieves message 7 or rather its content 9 from transmission buffer 11 (arrow 21 in FIG. 2), puts it into the right format (e.g. adding header 8 and trailer 10), in line with the communication protocol, according to which messages 7 are transmitted in communication system 1, and transmits message 7 via data bus 2 (arrow 22 in FIG. 2). The transmission of message 7 via data bus 2 takes place serially, and may therefore take relatively long. The exemplary embodiments and/or exemplary methods of the present invention relates to the case in which at any point in time, during the processing of the transmission job, the latter is canceled (so-called transmit cancellation), for instance, because first another, particularly urgent transmission job is to be processed. The transmission job begins with filing message 7, or rather its content 9, in transmission buffer 11, and ends with the reception of an acknowledgment from communication controller 4, that the message has been transmitted successfully or not.

In such a case, and also in other cases, it is necessary that application program 5 be informed of the result of the transmission job and a possible cancellation of the transmission job. That is why, in the related art, transmission buffers 11 are connected to status bits which are able to supply information as to whether the transmission job was handled successfully or not. Information on further events, especially in the case of a cancellation of the transmission job, cannot be inferred from the status bits. In case of a cancellation of the transmission job, in the CAN a sending process that has perhaps already been started (i.e. start of frame (SOF) already sent) is not broken off, but is continued until either the arbitration is lost, an error occurs or the message has been successfully sent. The application program 5 is not able to infer from the status bits which event has occurred, after all, after cancellation of the transmission job. In addition, application program 5 has to wait for the result of the transmission job, and, during this time, it is blocked, so to speak. In this connection, the present invention is able to offer improvements.

According to the exemplary embodiments and/or exemplary methods of the present invention, a transmission event memory 13 (Tx Stat) is provided, in each subscriber node 3, that is functionally separated from message memories 11, 12, in which a transmission event or a status for at least one message 7 that is to be sent, or has been sent, is stored. Of course, not all subscriber nodes 3 of communication network 1 have to be equipped with a transmission event memory 13. Event memory 13 may be developed as a memory having random access (RAM) and is organized like a FIFO. Naturally, event memory 13 may also be developed as a read-only memory (e.g. a flash memory, a ROM, an EEPROM). Event memory 13, may be developed as an integral component of communication controller 4, or separately from it. In addition, transmission event memory 13 may be developed separately from message memory 11, 12 or as a part of a message memory 11, 12. When event memory 13 is a part of a message memory 11, 12, the size of event memory 13, with respect to software, may be flexibly defined for instance, using configuration bits, corresponding to the individual requirements.

That is, the information on the status of the transmission jobs are no longer filed in a message memory 11, whose content was to have been sent, but in a separate transmission event list. The latter may include one entry per transmission event or cancellation event. With the aid of the exemplary embodiments and/or exemplary methods of the present invention, the information on the status of the transmission jobs may be managed in communication module 4 and filed in event memory 13 (arrow 23 in FIG. 2). Application program 5 is able to retrieve the data filed in event memory 13 flexibly in a timely manner (arrow 24 in FIG. 2). It is particularly advantageous that the data on the transmission jobs are now completely separated from transmission buffer 11. An additional advantage is that application program 5 no longer has to collect together the status information on the transmission jobs from different message memories 11, but that the data are able to be called up, which may be sorted by time, at a fixed place (in the transmission event list in transmission event memory 13). After the cancellation of a transmission job, message memory 11 is able to be used again immediately, without one's having to wait for the result of the transmission job or its cancellation. Application program 5 is able to read out the information filed in event memory 13 at a later time, and it does not have to react to it immediately (e.g. by interrupt). If event memory 13 threatens to overflow, because application program 5 reads it out too infrequently, a warning signal may be emitted in a first step, which may be connected to appropriate measures for the speeding up or the more frequent reading out of at least a part of the data. If memory 13 actually overflows, an error signal may be emitted. In this case, the oldest entries may be discarded in each case into transmission event memory 13, to make room for the information on current transmission jobs.

In the simplest case, event memory 13 contains results ordered by time of transmission jobs (message 7 sent, cancellation of transmission job taking place). The following are some examples of further events that are able to be filed in event memory 13:
1) message 7 successfully transmitted,
2) message 7 successfully transmitted, in spite of cancellation of transmission job,
3) transmission job canceled, transmission process not begun,
4) cancellation of the transmission job, transmission process ended after loss of the arbitration, and
5) transmission job canceled, transmission process ended after an error.

In addition to the transmission events for messages 7 that are to be sent or have been sent, additional information may also be filed in transmission event memory 13. There are various extension levels for the information content of memory 13. In memory 13, which may be identifiers (e.g. CAN identifiers) of messages 7 have been filed. The identifier enables a clear identification and the allocation of the filed information to certain messages, so that the messages do not necessarily have to be filed in memory 13 in time sequence. Reception of one or more of the following additional data in transmission event memory 13 is also conceivable:
1) a data-length code, which gives the length of payload part 9 of the at least one message 7 that is to be sent or has been sent,
2) a time mark that tells when the event filed in memory 13 occurred,
3) an address of message memory 11 for which the transmission job was present, and
4) a sequence counter that identifies data packages when, with the aid of a higher transport protocol, larger data volumes are sent sequentially in a plurality of messages 7 having the same identification code.

Because of the additional information, the handling of the stored transmission event by application program 5 is made easier. A time mark may be important for certain application programs 5. If subscriber node 3 has a plurality of transmission buffers 11, then it may be ascertained, with the aid of the address of message memory 11, for which the transmission job was present, which transmission buffer 11 is free for new transmission jobs. A sequence counter may be important during a software download, for example, if, for instance, at the end of the line or during a stop at a work shop, subscriber nodes 3 of communication network 1, developed as control units, are being programmed for the first time or using a new software version. In the process, the software is split up into a plurality of, for instance, 8-byte data packets which all have the same identification code. The sequence counter states for which of the data packets a transmission event has been filed in event memory 13 and which of the data packets has been successfully transmitted. The sequence counter was entered by application program 5 in message memory 11 when the transmission job was made. The method according to the present invention will be explained in greater detail below, with the aid of a flow chart shown in FIG. 3. The method begins in a functional block 30. In a functional block 31, application program 5 transmits data to be transferred to a transmission buffer 11. Application program 5 sends a sending command in functional block 32. Communication controller 4 retrieves the data from transmission buffer 11 in a functional block 33. In a functional block 34, controller 4 then stows data 9 in a message 7 corresponding to the communication protocol being used, and puts the data into the appropriate format. After that, in a functional block 35, message 7 is serially transmitted via data bus 2. The message transmission begins with the sending of an SOF bit.

Figure 3:
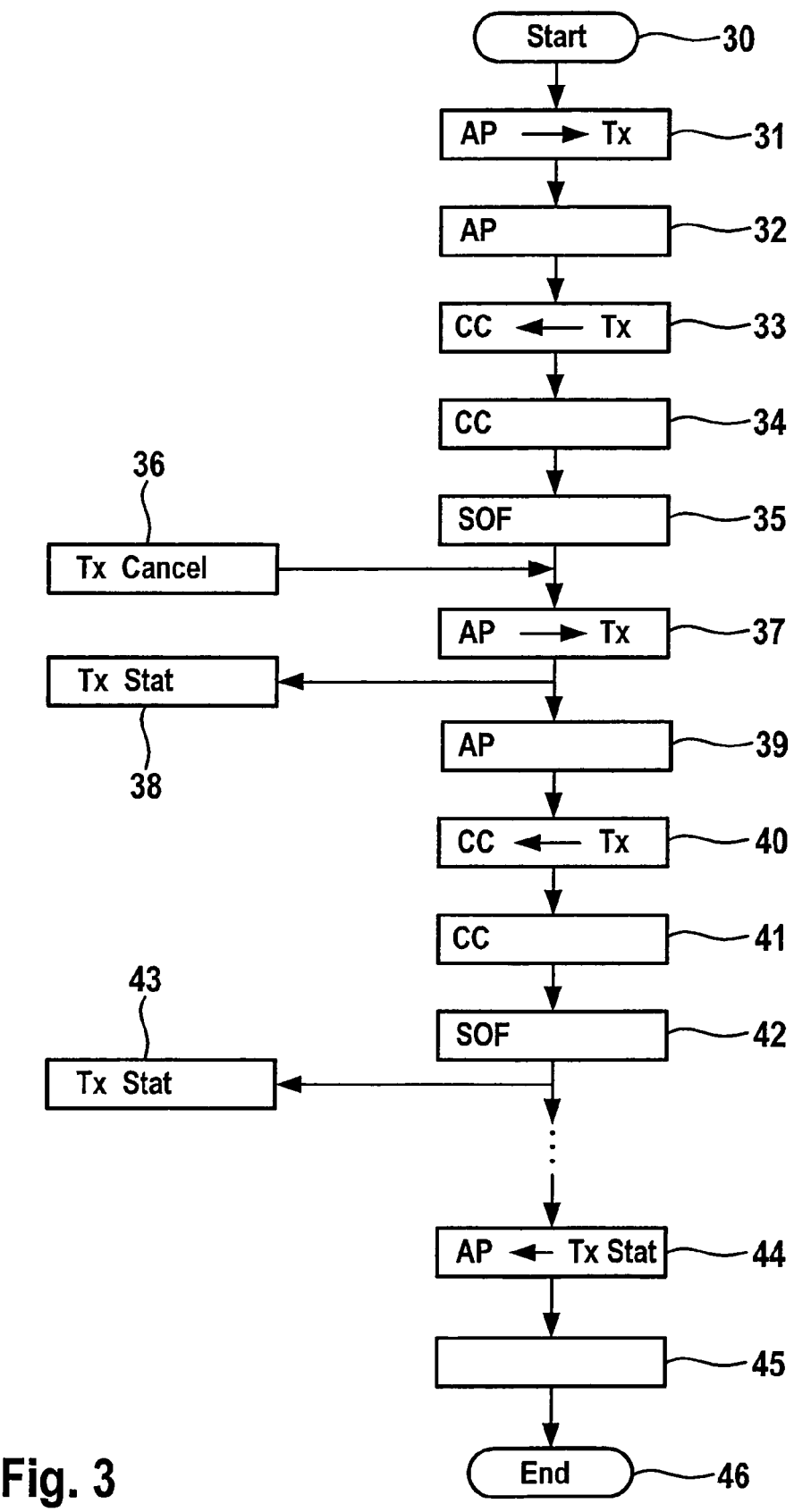
FIG. 3 shows an example of a flow chart of a method according to the present invention for transmitting messages via a communication network as in FIG. 1.

At any point in time during the processing of the transmission job (functional blocks 31 to 35), an event may occur that makes the cancellation of the transmission job necessary, for example, the desire for sending another message as soon as possible, that is more urgent or more important than the message of the current transmission job. The occurrence of such an event is illustrated in FIG. 3 by a functional block 36. In the example shown, event 36 occurs during the serial message transmission. Application program 5 cancels the current transmission job.

After the cancellation of the transmission job, application program 5, in a functional block 37, is immediately able to file new data again in a transmission buffer 11, namely, the data for the more urgent or more important message 7. Application program 5 does not have to await the end of the transmission of the first message or the result of the first transmission job. The capacity utilization and the efficiency of a host CPU (central processing unit) of subscriber node 3 can be improved thereby. The status of the first transmission job is filed by communication controller 4 in transmission event memory 13 at a later time, after the end of the transmission of the first message. This may take place at any time after the end of the transmission of the first message, and is illustrated in FIG. 3 by a functional block 38, for instance.

In a functional block 39, application program 5 sends a sending command for the transmission of the further message. Then, in a functional block 40, communication controller 4 retrieves the new data from transmission buffer 11. Thereafter, in a functional block 41, controller 4 stows data 9 in a second message 7 that corresponds to the communication protocol used, and puts the data into the appropriate format. After that, in a functional block 42, second message 7 is transmitted serially via data bus 2. The message transmission begins with the sending of an SOF bit. The status of the second transmission job is stored by communication controller 4, after the end of the transmission of the second message, at any later time, in transmission event memory 13. This is illustrated by a functional block 43 in FIG. 3, in exemplary fashion.

At any time after the end of the transmission of first message 7, the application program retrieves the result of the first transmission job from transmission event memory 13. In the example shown, this takes place in a functional block 44, after ending the transmission of second message 7, which has led to the cancellation of the first transmission job. As a function of the result of the first transmission job read in, in a functional block 45, application program 5 induces a renewed transmission of first message 7 (message not sent successfully) or does not (message sent successfully). The method is then ended in a functional block 46.

One may see the important aspects of the exemplary embodiments and/or exemplary methods of the present invention in that the capacity utilization of the host CPU is improved, after the cancellation of a transmission job, within the shortest time at which a new message is able to be begun, that detailed data on the individual transmission jobs are available, and that the filing of the data on the transmission jobs in the event memory and the reading out of these data are decoupled in time, without a blocking of the host CPU occurring thereby.

What is claimed is:

1. A subscriber node of a communication system including a data bus to which the subscriber node and at least one additional subscriber node are connected, comprising:
   a communication controller for at least one of sending messages via the data bus and receiving messages from the data bus; and
   a message memory for temporarily storing messages to be sent and that have been received;
   wherein:
      the subscriber node has at least one transmission event memory that is functionally separate from the message memories, in which a transmission event for at least one message, which is to be sent or which has been sent, is stored;
      the transmission event indicates a cancellation of a first transmission job:
      the cancellation of the first transmission job is caused by a request to transmit a second transmission job; and
      the subscriber node waits until the second transmission job has been completed before processing the transmission event that indicates the cancellation of the first transmission job.

2. The subscriber node of claim 1, wherein the transmission event includes at least one of the following events:
   a message that is successfully sent in spite of the cancellation of the first transmission job,
   the cancellation of the first transmission job, where a transmission of the first transmission job has not yet begun,
   the cancellation of the first transmission job, where a transmission of the first transmission job has ended after loss of arbitration, and
   the cancellation of the first transmission job, where a transmission of the first transmission job has ended after an error.

3. The subscriber node of claim 1, wherein an identifier of the at least one message that is to be sent or has been sent is stored in the transmission event memory.

4. The subscriber node of claim 1, wherein at least one of the following data are stored in the transmission event memory:
   a time mark which tells when the event occurred,
   an address of the message memory, for which the transmission job was present, and
   a sequence counter, which identifies data packets when larger data volumes are sent sequentially in a plurality of messages having the same identifier.

5. The subscriber node of claim 1, wherein the transmission event memory has a plurality of memory elements, in each memory element information being stored on a message that is to be sent or that has been sent.

6. The subscriber node of claim 1, wherein the transmission event memory includes a memory having random access.

7. The subscriber node of claim 1, wherein the transmission event memory is developed as a part of a message memory.

8. The subscriber node of claim 7, wherein a size of the transmission event memory is configurable using configuration bits.

9. A communication system, comprising:
   a data bus;
   a plurality of subscriber nodes connected to the data bus for transmitting data, the subscriber nodes each having a communication controller for at least one of sending messages via the data bus and receiving messages from the data bus; and
   message memories for temporarily storing messages to be sent and received;
   wherein:
      at least one of the subscriber nodes has at least one transmission event memory, which is functionally separate from the message memories, in which a transmission event for at least one message, which is to be sent or which has been sent, is stored;
      the transmission event indicates a cancellation of a first transmission job;
      the cancellation of the first transmission job is caused by a request to transmit a second transmission job; and
      the at least one of the subscriber nodes waits until the second transmission job has been completed before processing the transmission event that indicates the cancellation of the first transmission job.

10. A method for transmitting a message from a first subscriber node of a communication system via a data bus of the communication system to a second subscriber node of the communication system, the method comprising:
    using an application program of the first subscriber node to copy the message, which is to be sent, into a message memory, from where it is retrieved by a communication controller, upon a sending command of the application program and is transmitted via the data bus; and
    storing a transmission event for the message, which is to be sent or which has been sent, in at least one transmission event memory that is functionally separate from the message memory, wherein:
       the application program is able to access it at any time,
       the transmission event indicates a cancellation of a first transmission job, and
       the cancellation of the first transmission job is caused by a request to transmit a second transmission job; and
    waiting until the second transmission job has been completed before processing the transmission event that indicates the cancellation of the first transmission job.

* * * * *